July 15, 1941.  F. T. O'GRADY  2,249,033
APPARATUS FOR PRINTING MOTION PICTURE FILMS
Original Filed Nov. 1, 1937  2 Sheets-Sheet 2
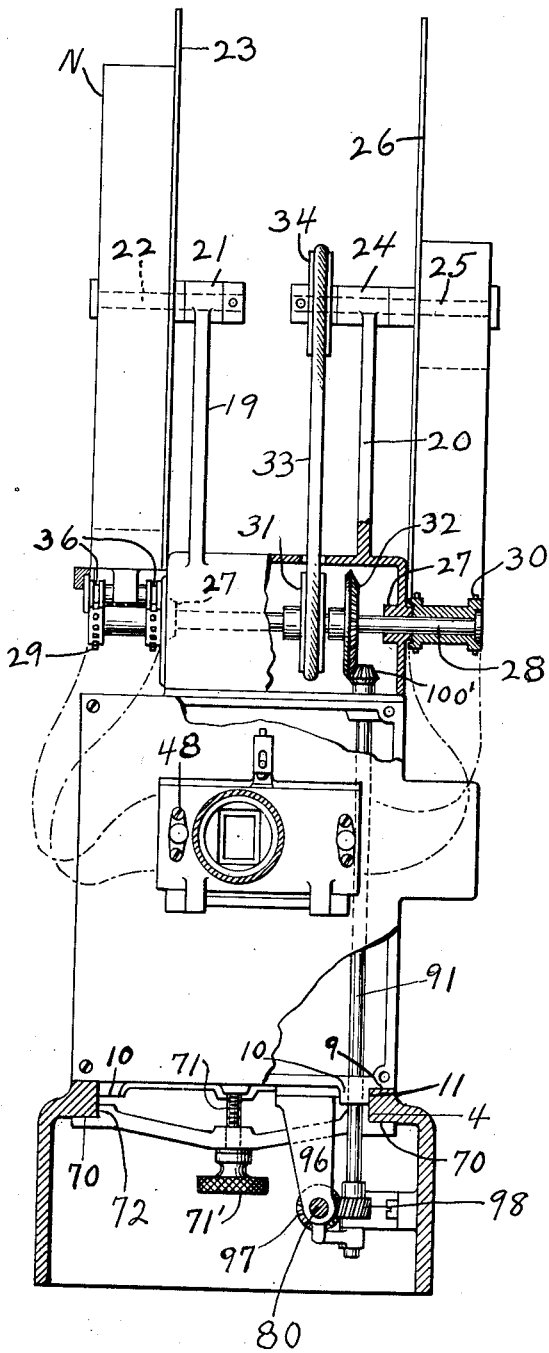
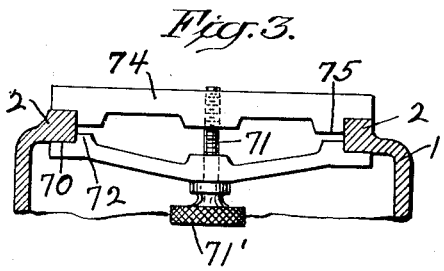
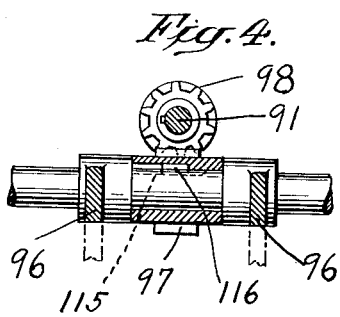
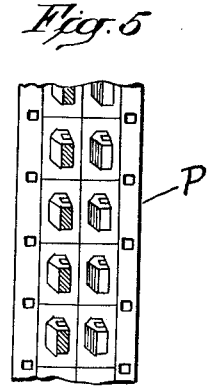
INVENTOR
FREDERICK T. O'GRADY
BY
ATTORNEY

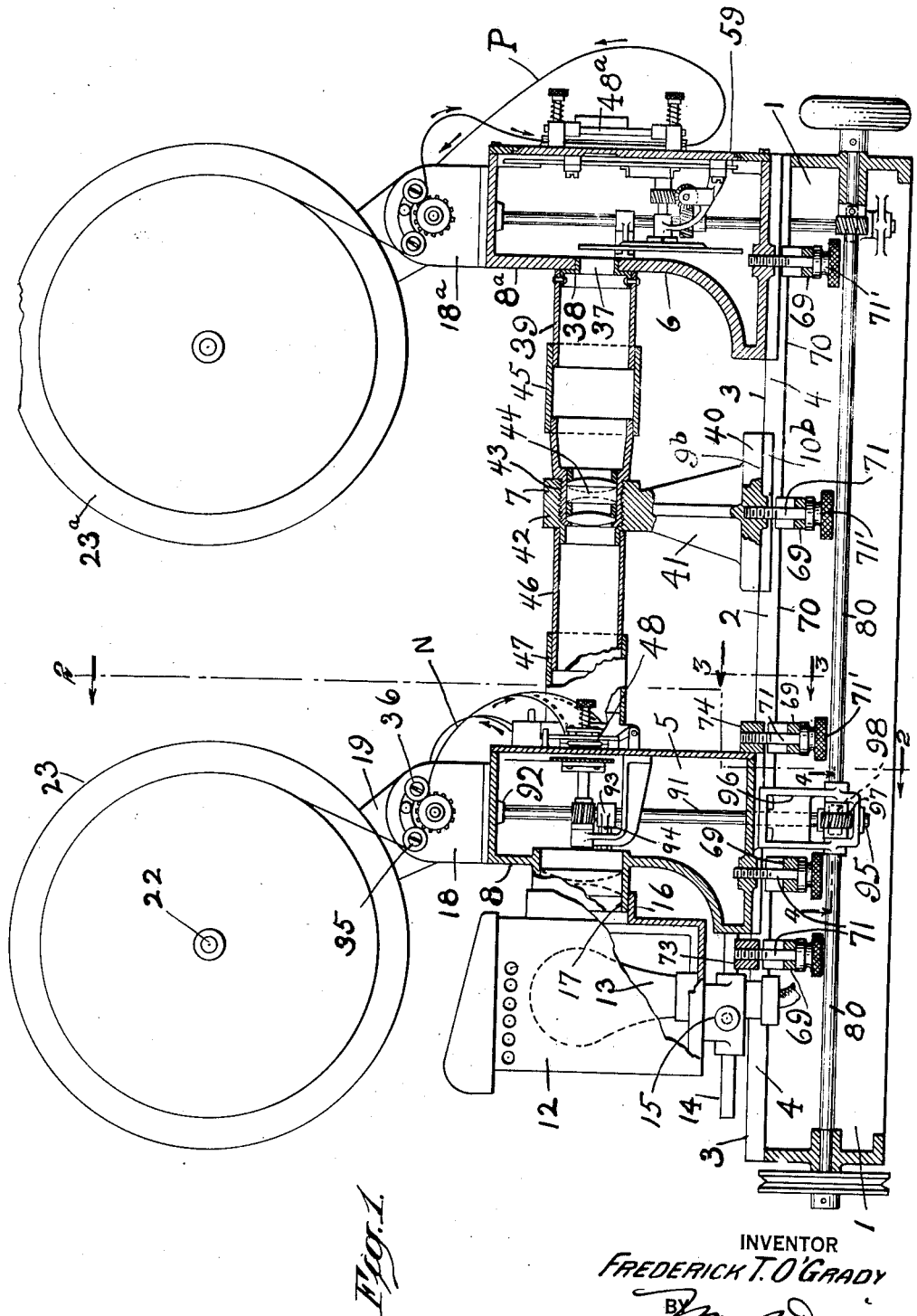

Patented July 15, 1941

2,249,033

UNITED STATES PATENT OFFICE 2,249,033

APPARATUS FOR PRINTING MOTION PICTURE FILMS

Frederick T. O'Grady, Flushing, N. Y.

Original application November 1, 1937, Serial No. 172,089, now Patent No. 2,207,103, dated July 9, 1940. Divided and this application June 8, 1940, Serial No. 339,436

2 Claims. (Cl. 88—24)

This application is a division of my application for patent filed November 1, 1937, Serial Number 172,089, and entitled Apparatus for printing motion picture films, which application has matured into Patent No. 2,207,103, issued July 9, 1940.

The present invention provides apparatus for accurately printing, from Bipack negative films, images upon a positive film, as described in my said application serially numbered 172,089.

An important object of the present invention is to provide, in a motion picture film-printing apparatus, means for obtaining more clear and accurate printing of images or image components which are intended to be simultaneously projected in registration upon a viewing screen in order to produce a single, complete picture upon the screen.

Other objects of the invention will appear hereinafter.

In the drawings,

Fig. 1 is a side view of the apparatus partly in section and partly in elevation;

Fig. 2 is an enlarged vertical section on the line 2—2 of Fig. 1, parts of the negative head being shown in section;

Fig. 3 is an enlarged detail sectional view on the line 3—3 of Fig. 1;

Fig. 4 is an enlarged sectional view on the line 4—4 of Fig. 1; and

Fig. 5 is a face view of a portion of the completely printed positive film.

In order that the present invention may be better understood a brief description of the method of printing described in said application is included herein.

In the said method a pair of negative films of a kind known in the art as "Bipack" films are exposed simultaneously in a camera. One of such negative films bears upon a face thereof a coating of emulsion responsive to red light and the other film bears a coating of emulsion responsive to green light. These films are arranged with their emulsion-coated faces in contact at the camera aperture for simultaneous exposure.

Thereby there are obtained two negative pictures which are duplicates except that one has a record of red and the other has a record of green. Assuming that the object photographed is a building with a red roof and green side walls, one of the negative films will have a record of red upon the roof section of its image and the other will have a record of green upon the side walls of its image. Successive exposures are made along the films and each picture fills an entire standard-size picture area.

The so-exposed negative films are separated and their pictures printed upon a positive film. In the printing operation one of the negative films is advanced intermittently in one direction across the path of printing light flux and the positive film is advanced intermittently in a direction at right angles to the direction of advance of the negative film and across the light flux, for printing the negative pictures and color records in succession upon and along the positive film in on-end arrangement. That is with each image swung around ninety degrees from upright position. Between the positive and negative films optical means are arranged to reduce the scale of the images projected from the negative films by the printing light flux so that each image can be printed within a portion only of a standard size picture area upon the positive film. An entire series of images is thus printed upon the positive film along one side of a longitudinal central line. In a similar manner the pictures and color records borne by the other negative film are printed in reduced scale upon the positive film along the opposite side of the longitudinal center line.

The positive film so prepared is intermittently advanced vertically downward through a standard projection machine and the pairs of images are disposed in succession for simultaneous projection of each pair. The images of the pair are projected through separate sets of projection lenses and the latter are arranged to combine or superimpose the two images in optical register with each other for projection as a single image upon a viewing screen. In their passage to the viewing screen the projection light rays are bent to swing the projected images around ninety degrees for projection in upright position upon the screen. In their passage to the viewing screen the pair of projected images are also directed through a pair of color filters arranged alongside of each other. The image projected from the film pictures bearing the red color record is projected through a red color filter and the image projected from the film picture bearing the green color record is projected through a green color filter to thereby impart to the single image upon the viewing screen the said several colors of the object photographed.

The apparatus claimed in this application is especially designed for use in the film printing apparatus disclosed in my aforesaid copending application.

As previously mentioned, when Bipack negative films are employed in photographing, their emulsion coated surfaces are disposed in contact at the camera exposure aperture. Therefore one film, say the one with the emulsion responsive to red light, will have the emulsion disposed upon its rear face and the other film will have its emulsion upon its front face. The two films are employed separately in the printing of the positive film and, for correct focusing, it is desirable that the emulsion coated faces of the two films be disposed in the same position successively with reference to the lenses and the positive film. In order to obtain this, provision is made for fine adjustment of the negative along the optical axis of the printing apparatus.

The apparatus includes a base 1 formed of an elongated frame-like casting open at its upper and lower sides. At its upper side the base is formed with a pair of parallel guide ribs 2 running longitudinally of the base and having smooth, horizontal upper surfaces 3 and smooth vertical inner surfaces 4. The surfaces 3 are in the same horizontal plane, and the surfaces 4 are in parallel vertical planes and form the opposite sides of a wide slot extending the length of the base. The under side of the base is flat and parallel to the surfaces 3. The base forms a support for a negative film-handling unit 5 which will be referred to as the "negative head," a positive film-handling unit 6, referred to as the "positive head," and an optical unit 7 disposed between the film-handling units. The units 5 and 7 are adjustable along the base. The negative head also bears a printing light source.

The negative head 5 includes a box-like metal casing or housing 8 formed at its under side with flat, smooth marginal surfaces 9 to rest upon the upper surfaces 3 of the base. Guide ribs 10 are also formed upon the under side of the casing and have smooth vertical outer surfaces 11 disposed to slidably engage the base surfaces 4. The surfaces 9 and 11 are of material length for firm, accurate support of the negative head in operative position. At its rear side, that is the left with reference to Fig. 1, the casing 8 bears a printing light unit comprising a casing 12 containing an electric lamp 13. For support of the lamp casing the casing 8 bears a pair of rigid, parallel rods 14 projected rearward, and the lamp casing has at its under side a supporting bracket 15 with bores slidably receiving said rods. The forward side of the lamp casing has a light-projection aperture defined by an annular flange 16 which telescopes over a tubular section 17 formed on the rear side of the casing 8 and defining a light-projection aperture therein. At its forward side the casing 8 bears a film-advancing mechanism which is fully described in my aforesaid application Serial Number 172,089.

A smaller casing 18 is borne by the upper side of casing 8 and in turn bears upwardly and rearwardly extending bracket arms 19 and 20. A bearing 21 on the upper end of arm 19 supports a horizontal stub shaft 22 upon which a let-off spool 23 for a negative film N it rotatably and removably mounted. A bearing 24 borne by the upper end of bracket arm 20 supports a shaft 25 in horizontal axial alinement with shaft 22. A film take-up pulley 26 is keyed to and removably mounted upon shaft 25. At its opposite sides the casing 18 has bearings 27 supporting a shaft 28 parallel to the said spool shafts. Shaft 28 extends through casing 18 and beyond the opposite sides thereof and has film-advancing sprocket wheels 29 and 30 affixed to its end portions. Within the casing a grooved pulley 31 and a bevel gear 32 are fixed to shaft 28. A spring belt 33 makes a driving connection between pulley 31 and a pulley 34 fixed to the shaft 25 of the take-up spool. The power transmission for driving shaft 28 is fully described in my application Serial No. 172,089. At the opposite sides of casing 18 there are also mounted film-guiding and pressing rollers 35 and 36 to train the film around the sprocket wheels.

The negative film-advancing mechanism is so arranged upon the front wall of the casing 8 as to advance the film end along a horizontal line from left to right with reference to Fig. 2. Said mechanism includes a film guiding and supporting means indicated generally by the reference character 48 and said mechanism is provided with apertures to expose one of the film pictures in optical alinement with the light projection aperture at the rear of the casing 8, the lens assembly 44 and the aperture 37 of the positive head. All of this mechanism is fully described in my aforesaid application Serial No. 172,089 and it is thought to be unnecessary to show and describe them in detail herein.

Much of the structure of the positive head 6 is similar to that of the negative head. It includes a similar casing 8$^a$ similarly mounted upon the base 1 with under side surfaces resting upon the base surface 3, and rib surfaces engaging the base surfaces 4. A casing 18$^a$ similar to casing 18 but of less width, is mounted upon the casing 8$^a$ and bears a mounting for a let-off film spool 23$^a$ similar to the mounting for the spool 23. The rear wall of the casing 8$^a$ has an aperture 37 defined by an annular member 38 fitted within a hole in said wall. Outside of the wall said annular member has its diameter enlarged and telescoped over it in a tubular member 39, for connection with the optical unit 7. Other features of the positive head are fully described in my application Serial No. 172,089.

The positive film-advancing mechanism is borne by a plate 59 mounted at the front of the positive head casing 8$^a$, in a vertical plane at right angles to the optical axis of the apparatus. The plate 59 is supported for horizontal sliding adjustment and it has an exposure aperture whose shape and size correspond to that of a reduced scale picture to be printed on the film P at one side of the longitudinal, center line of the film. The plate 59 and the mechanism carried thereby and the portion of the film engaged by the guiding and supporting means carried by the plate may be shifted laterally to register reduced picture-receiving areas at opposite sides of the longitudinal center line of the film. The positive film-advancing mechanism is similar to the negative film-advancing mechanism except that it is arranged to advance the film vertically downward. The mechanism for supporting and guiding the positive film and mounted on the plate 59 is indicated generally by reference character 48$^a$. All of this mechanism is fully described and shown in my aforesaid application Serial No. 172,089 and it is thought to be unnecessary to show and describe it in detail herein.

The optical unit 7 includes a base 40 mounted upon the base 1 similarly to the casing 8 and 8$^a$ having flat under side margins 9$^b$ to rest slidably upon the base surfaces 3, and ribs 10$^b$ to engage the base surfaces 4. A pedestal 41 is formed upon the base of the optical unit and has, rigid with its upper end, an internally screw threaded annulus 42. A lens unit is secured within said annulus and includes an externally threaded tubular member 43 screwed into the annulus and containing a lens assembly 44 designed to reduce the scale of each image projected therethrough from the negative film N to the positive film P. The forward end of the tubular member 43 telescopes within one end of a sleeve or muffet 45 whose opposite end telescopes over the tubular member 39 connected to the positive head. The annulus 42 has at its rear side an annulus flange telescoped within a tubular member 46 over the rear end of which there is telescoped a sleeve or muffet 47 for connecting with the negative film head.

The negative film-advancing mechanism and positive film-advancing mechanism are fully described in my application, Serial No. 172,089 and need not be described herein.

The positive and negative head units and the optical unit are all adjustable along the base 1 to arrange them in proper operative correlation, and clamping means are provided to maintain their adjustments. Beneath each of said units there is a transverse clamping bar 69 formed so that its end margins will abut flat, downwardly facing surfaces 70 of the base 1. At the middle of its length said bar has an aperture through which a clamping screw 71 extends. The upper end of said screw is screwed into a threaded aperture at the under side of the unit, and the lower end of the screw has a knurled head 71' and an abutment to engage the under side of the clamping bar. By tightening the screw the bar is forced against the surfaces 70 and the base of the unit is forced against the track surfaces 3 of the base 1 to thereby lock the unit to the base. Ribs 72 on the bar engage the base surface 11 to prevent the bar from turning.

Mounted upon the base 1, in positions fore-and-aft of the base portion of the casing 8, are two metal stop cleats 73 and 74. Each cleat has flat, smooth end margins at its under side to rest upon the track surfaces 3 of the base. At its under side the cleat also has guide ribs 75 to engage the guide surfaces 4 of the base. The cleats are slidably adjustable along the base, and in order to hold each in an adjusted position there are a clamping bar 69 and screw 71 similar to those employed for clamping the negative and positive film head units and the optical unit to the base. The cleats are clamped upon the base in positions spaced apart a distance exceeding the length of the base portion of the casing 8 by the thickness of the film N exclusive of the emulsion thereon. The negative head is then adjustable fore-and-aft between the cleats to the degree of the film thickness to dispose the portion of either negative film located at the film gate in the proper position along the optical axis.

For driving the film-advancing devices of the negative head a shaft 91 extends vertically through the casing 8 and is rotatably supported by an upper bearing 92 borne by the upper wall of the casing, an intermediate bearing 93 borne by a bracket 94 affixed to the interior of the casing; and a lower bearing 95 borne by a depending bracket 96 affixed to the underside of casing 8. Bracket 96 is yoke-like and contains a spiral gear 97 keyed to the horizontal main shaft 80. A spiral gear 98 in mesh with gear 97 is keyed to the vertical shaft 91. A bevel gear 100' is keyed to the upper end of shaft 91 and meshes with bevel gear 32 keyed to shaft 28 which also bears the driving pulley for the film takeup spool 26 and the film-feeding sprocket wheels 29 and 30. By means of the said shafting and gearing rotation of the shaft 80 will cause operation of the film-advancing mechanism at the feed gate, rotation of the film-feeding sprocket wheels 29 and 30 and rotation of the takeup spool.

The positive head when once adjusted in proper position, remains in said position. The negative head, however, is adjustable along the base. In order to maintain its driving connection with the main shaft 80 in the different adjustments, the shaft, as shown in Fig. 4, is provided with elongated key-way 115 and the gear 97, constrained to shift with casing 8 by the bracket 96 borne by the casing, has a key 116 slidable in said elongated key-way to maintain the driving connection.

Assume that in the printing operations there is first employed the exposed Bipack negative film bearing the pictures with the records of the color red and the emulsion is upon the rear face of the film. The negative head is first adjusted forward along the optical axis to bring the forward side of its casing 8 against the forward stop cleat 74, and the casing is then clamped to the base. The positive film guiding and positioning means is adjusted laterally to position the positive film for receiving the printing light flux projected upon a picture area of the film located at one side of the longitudinal center line.

Having made said adjustments of the negative head and the positive film, and having adjusted and clamped the optical unit 7 for correct focusing, the shaft 80 is driven to advance the films N and P intermittently and in unison.

As fully disclosed in my aforesaid copending application, the negative film N is advanced horizontally across the exposure aperture 50 and the positive film P is advanced vertically downward. The images projected from the negative film are reduced in scale by the lenses of the optical unit and projected in on-end arrangement upon the positive film at one side of the longitudinal center line. At the conclusion of this printing from said one of the two Bipack films the positive film will appear with all of the printed pictures having records of the color red arranged at one side of the center line.

The Bipack negative film having pictures with photographed records of the color green is next employed to complete the printing of the positive film. Assuming that said negative film has the emulsion upon its front face, the negative head is adjusted rearward along the optical axis to bring the rear face of its casing 8 in contact with the rear stop cleat 73 and the casing is then clamped in position. This will dispose the emulsion face of the film in the same position as that of the film first employed. The driving connection between the main shaft 80 and shaft 91 is maintained during the adjustment of the negative head, as herein described. The positive film guiding and positioning means is shifted laterally and the same positive film is again advanced through the positive head in unison with the second negative film, and the successive standard size negative pictures are reduced in scale to the same degree as before and projected upon the positive film in on-end arrangement at the opposite side of the center line. The completely printed positive film will appear as in Fig. 5 with a series of pairs of side by side pictures, each pair occupying a standard size picture area and having, one a printed record of the color red, and the other printed record of the color green.

The reduced pictures of each pair on the positive film are simultaneously projected and superimposed on the viewing screen. It is therefore very important that the pictures of each pair be identical in focus. If the pictures are not identical in focus the difference will be immensely magnified on the viewing screen with the result that the picture will have a slightly out-of-focus appearance. With the present invention and by the adjustment of the negative head along the axis of the optical system a distance equal to the thickness of the negative film, as hereinbefore described, the emulsion coating on each of the films, in each printing operation, will be in exactly the same position with respect to the lens system and the pictures of each pair will be accurately and identically focused and printed on the positive film.

What I claim is:

1. Motion picture film-printing apparatus comprising optical means, a negative film supporting and advancing unit and a positive film supporting and advancing unit both mounted in alinement with the optical axis of said optical means for printing projection of successive pictures from a negative film through the optical means and upon successive picture spaces of a positive film, characterized in that said negative unit is adjustable along said optical axis toward and from the optical means, and there are positive stop means to limit said adjustment to a distance equal to the thickness of the negative film base, to compensate in focusing for location of an emulsion coating on either the front face or the rear face of the negative film.

2. Film-printing apparatus according to claim 1, characterized in that there is a base supporting the said optical means, said film supporting and advancing units and said stop means, said stop means include stop members located fore-and-aft of said negative unit, the negative unit, the optical means and the stop means are all individually adjustable upon the base along the optical axis, and there are means for releasably securing the optical means and said stop means to the base to retain their adjustments, whereby the optical means and said negative unit may be adjusted for focusing one face of the negative film with relation to the positive film and then the negative unit may be adjusted to the degree permitted by the stop means to compensate for location of the emulsion coating upon either the front face or the rear face of the negative film.

FREDERICK T. O'GRADY.